United States Patent
Leonard

(10) Patent No.: US 8,060,573 B2
(45) Date of Patent: Nov. 15, 2011

(54) MATCHING SOCIAL NETWORK USERS

(75) Inventor: Melissa Leonard, Woodland Hills, CA (US)

(73) Assignee: MeetMyKind, LLC, Woodland Hills, CA (US)

(*) Notice: Subject to any disclaimer, the term of this patent is extended or adjusted under 35 U.S.C. 154(b) by 244 days.

(21) Appl. No.: 12/622,729

(22) Filed: Nov. 20, 2009

(65) Prior Publication Data

US 2010/0125632 A1    May 20, 2010

Related U.S. Application Data

(60) Provisional application No. 61/116,304, filed on Nov. 20, 2008.

(51) Int. Cl.
*G06F 15/16*    (2006.01)
*G06F 15/173*    (2006.01)

(52) U.S. Cl. ........ 709/206; 709/203; 709/204; 709/226; 709/228

(58) Field of Classification Search ............... 709/203, 709/204, 206, 217, 219, 224, 226, 228
See application file for complete search history.

(56) References Cited

U.S. PATENT DOCUMENTS

| | | | |
|---|---|---|---|
| 7,080,117 B2 * | 7/2006 | de Pinto et al. | 709/203 |
| 7,085,806 B1 | 8/2006 | Shapira | |
| 7,188,153 B2 * | 3/2007 | Lunt et al. | 709/204 |
| 7,280,977 B2 | 10/2007 | Sengir et al. | |
| 7,430,561 B2 | 9/2008 | Bailey et al. | |
| 8,019,692 B2 * | 9/2011 | Rosen | 705/319 |
| 2004/0210661 A1 * | 10/2004 | Thompson | 709/228 |
| 2009/0055249 A1 * | 2/2009 | Lieberman | 705/10 |
| 2009/0063379 A1 * | 3/2009 | Kelly | 706/46 |
| 2009/0307314 A1 * | 12/2009 | Smith et al. | 709/206 |
| 2010/0125632 A1 * | 5/2010 | Leonard | 709/204 |
| 2010/0198773 A1 * | 8/2010 | Wallisch | 706/54 |

* cited by examiner

*Primary Examiner* — Quang N. Nguyen
(74) *Attorney, Agent, or Firm* — SoCal IP Law Group LLP; Steven C. Sereboff; John E. Gunther

(57) ABSTRACT

Systems and methods are disclosed for matching of individuals to one another using a matching model. The matching model matches social network users based on ratings given by users one to another, as well as, as appropriate and available, explicit attributes indicated by users and other data such as location data and system usage data.

25 Claims, 8 Drawing Sheets

Tell Us About Yourself

Basics

What is your gender? [Female] — 132

When were you born? — 133
[Jan] [5] [1972]

What is your relationship status? [Single] — 134

How tall are you?
[5] feet — 135 [7] inches — 136

What is your zip code? — 137
[90210]

What's your body type? — 138
[Athletic]

Tell us about your looks — 139
[Model good looking]

[Quit] — 140  [Previous] — 141  [Next] — 142

*FIG. 3*

Basics

What gender is your match? —143
- ✓ Male
- ☐ Female

What age is your match? —144
Between [0] and [99] years old

How tall is your match? —145
Between [5] feet [0] in
and [8] feet [0] in tall

What relationship status? —146
- ✓ Single
- ☐ Married
- ✓ Divorced
- ✓ Widow/Widower
- ✓ Never been married
- ☐ Have significant other
- ☐ Special situation

[Quit]—147  [Previous]—148  [Next]—149

Tell Us About Your Match – For Dating

File  Edit  View  Window  Help

User 1

[image of person icon] — 193

More Photos — 197
Send an email — 198
See linked profiles — 199
See friends — 200
Wink at user — 201
Invite as friend — 202
Remove as match — 203
Block user — 204
See user's blogs Help us find better matches for you:
Have you met User 1 in person?  |No, not yet|  |Yes, I have|  — 194
How good of match is this person for you?  — 195
|1| |2| |3| |4| |5|
Poor    Average    Good Basics — 196

Gender:              Male
Age:                 38
Relationship status: Single
Height:              6 feet 0 inches
Body type:           Muscular
Looks:               Model good looking
Location:            Los Angeles, California

MATCHING SOCIAL NETWORK USERS

RELATED APPLICATION INFORMATION

This patent claims priority from the following provisional patent application: Application No. 61/116,304 filed Nov. 20, 2008 and entitled "System and Method for Matching Social Network Users" which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to matching of individuals one to another through online systems or through use of mobile, wireless, and/or electronic devices.

2. Description of the Related Art

Social network services have been in existence for a number of years. Social network services typically consist of online communities of individuals who share common background, attributes, interests and/or activities, and who are interested in meeting and/or interacting with other individuals in the network. Most social network services are web based and provide a variety of ways for users to interact, such as e-mail, instant messaging, posting blogs, and posting comments on each other's social network profile pages. A number of social network services have developed solutions to accommodate users participating in social networks through use of wireless devices, and other portable electronic devices.

Conventional social networking solutions, such as online social networks, typically require a user who wants to find other members that share similar interests to designate the specific attributes sought at the same time as the user wants to find these members. It is often difficult to find users with desired qualities because conventional social networking solutions typically have many users, and entering desired attributes often returns too many potential matches. Searching for other members that a user would find of interest oftentimes requires sorting through the profiles and data of many other members and/or performing multiple searches to find individuals of interest.

Users of many conventional social networks may also search for individuals that one may have interest in by scanning though the profiles and data of users associated with already-known members. In some instances, meeting individuals who have an established relationship with an already-known individual may require a user to request permission from a user's already-known contact, the person of interest, or both. This results in a delay for the user before the user can meet the person of interest as well as additional user effort.

Further, although a user may find another member in a social network desirable and may want to interact with that individual, it is often difficult to determine if the user himself or herself has attributes that the other individual would find desirable.

DESCRIPTION OF THE DRAWINGS

FIG. 3 is a screen display of a registration interface.

FIG. 4 is a screen display of an attribute definition interface.

FIG. 6 is a screen display of a profile and rating interface.

DETAILED DESCRIPTION

Figure 1:
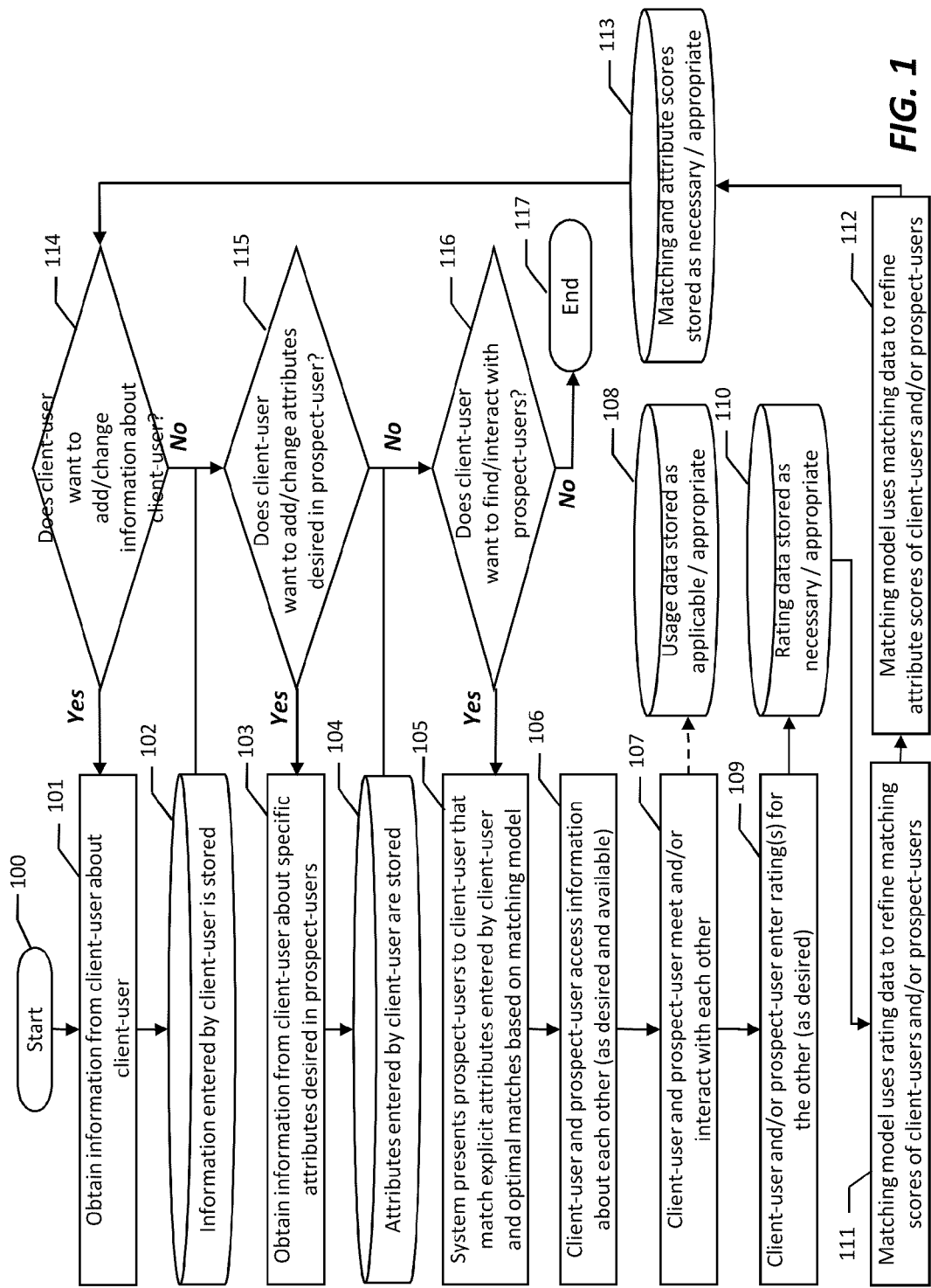
FIG. 1 is a first flowchart of a process for matching social network users.

Systems and methods for recommending matches of people in social networks are described. The systems and methods provide a registered user of a social network system (a user) with a mechanism for locating and interacting with other people that may or may not be registered users of the social network system (prospects). A user may find prospects by entering explicit attributes that the user is looking for in prospects, through the user's ratings of other users (e.g., prospects), and through other data such as data gathered about the user's interaction with other users. This may go beyond the explicit attributes that a user would want a prospect to have to infer the prospects that a user would have interest in based on the ratings the user has entered about other users, the user's interaction with the system, and other data.

The process for a user to find prospects of interest may initiate with a user registering with an online system. For example, the user may be asked to enter basic identifying information into the system, and may be prompted to enter further information (e.g., profile information) about the user as the user would like. A user may create a user profile. A user may attach files such as one or more digital photograph files to a their profile. The user may also be prompted to enter the attributes that the user would want to find in matched prospects.

Explicit attribute data and rating data may be entered by the user and used to find prospects of interest. The system may use a model to determine the similarity of one user to another user based on scores that the system maintains about the characteristics of each user (e.g., attribute scores) and scores that represent the type of prospects that a user would want to meet (e.g., matching scores). For example, a user may enter data about the user stating that the user is funny and good-looking. The system, in this example, would capture a high score for the "funny" attribute category and a high score for a "physical attractiveness" attribute category. As an extension of the present example, the user may enter attributes regarding the prospects that the user would want to meet. For example, the user may enter that the user would be interested to meet "funny" and "physically attractive" users, and the matching scores for these two categories would resultantly be high.

According to the model, a variance (e.g., proximity) between the attribute scores of a user and the matching scores of prospects, and the matching scores of a user and the attribute scores of prospects may be obtained. As the attributes scores indicate the attributes that a user possesses, and the matching scores indicate the attributes that a user is seeking, by calculating the variance between the user's matching and the prospect's attribute scores, and the prospect's matching scores and the user's attribute scores, a nearest-to match can be derived. This type of matching is referred to as attribute and matching score proximity matching, herein. Look-up tables may be used instead of or in addition to calculations.

Further, the system may use the rating scores of users and prospects to validate and adjust the attribute scores and matching scores of the users and the prospects. As an extension of the prior example, if collected data indicates that a user likes funny individuals and the user rates a prospect low, the system may infer that the prospect is not funny.

Some prospects may have similar ratings to other prospects. These similarities may be used to indicate prospects which are similar one to another and a degree of similarity. A user may be matched with prospects that are most-like those the user has rated higher in the past, where the prospects have, in turn, rated users similar to the user higher in the past. This type of matching is referred to as rating score proximity matching.

Attribute and matching score proximity data and rating score proximity data may be combined with explicit attribute data and other data to recommend prospect matches for the user. A relevance engine may be used in the matching process.

A user may view stored information about prospects and interact with prospects. If a user is interested in contacting or learning more about a recommended (e.g., matched) prospect, the user may view the profile and other information entered by the prospect. Once a related button or link is selected, a document (e.g., a web page or voice message) may be presented to the user that comprises more detailed profile information and/or other information about the prospect. The user can also initiate communication with the user. If the user wishes to communicate with the prospect, the user can elect to send a message to the user. For example, the user may select a command button or link that causes the system to transmit a response message to the user via a computer network.

A user may rate a prospect by selecting a button that indicates how good of a match the prospect is for the user. A prospect may be able to rate a user by selecting a button that indicates how good of a match the user is for the prospect. Following, these ratings may be used by the matching model to further refine the matches that are offered to each user.

The Overall Matching Process:

Referring now to FIG. 1 there is shown a flow chart of a process for locating prospects that may be of interest to a user. FIG. 1 illustrates how a user may interact with prospects and for users and prospects to rate (e.g., provide a rating for) one another. FIG. 1 illustrates how to refine what is known about each user and subsequent matching based on the ratings given by one user to the next.

The Registration Process:

The process may initiate at 100 when the user (e.g., a user wishing to locate and/or interact with one or more persons of interest), registers with the system. The user enters information about the client user at 101. Various kinds of information may be obtained from the user. The system may, for example, provide the user with an interface for entering a user name, a password, and other information associated with the user in order to identify the user.

Users may enter information about themselves through a registration interface such as that shown in FIG. 3. Such information may comprise a user's gender 132, birth date 133, relationship status 134, height in feet 135 and inches 136, zip code 137, body type 138, and other profile information. Profile information may comprise any type of information that would help define and/or explain the user's character traits, personality physical attributes and/or other personal attributes.

Referring again to FIG. 1, the information entered by a user at 101 (e.g., through a registration interface illustrated in FIG. 3) is then stored for later retrieval at 102.

Sought Attributes Entry Process:

As shown at 115 and 103, users may be given an opportunity to enter the explicit attributes that users want to find in prospects. Users may specify that they want to be matched for dating, for friendship, for networking and many other reasons. Users may enter sought attributes for each of these relationship categories.

Referring now to FIG. 4, a sought attributes interface presented to the user is shown. The sought attributes interface presents each user with the ability to enter information regarding the attributes that the user would like matched prospects to possess. Such information may comprise a user's gender 143, age 144, height 145, relationship status 146, and other factors.

Referring again to FIG. 1, the information entered at 103 (e.g., through the sought attributes definition interface as illustrated in FIG. 4) is then stored for later retrieval at 104.

Matching Prospects to Users:

As shown at 116 and 105 in FIG. 1, the system may match prospects to a user by use of a matching model. Explicit attributes entered by the user at 103 may be used for matching. Rating and other data may be used for matching insofar as the relevant data is available for a user.

Figure 2:
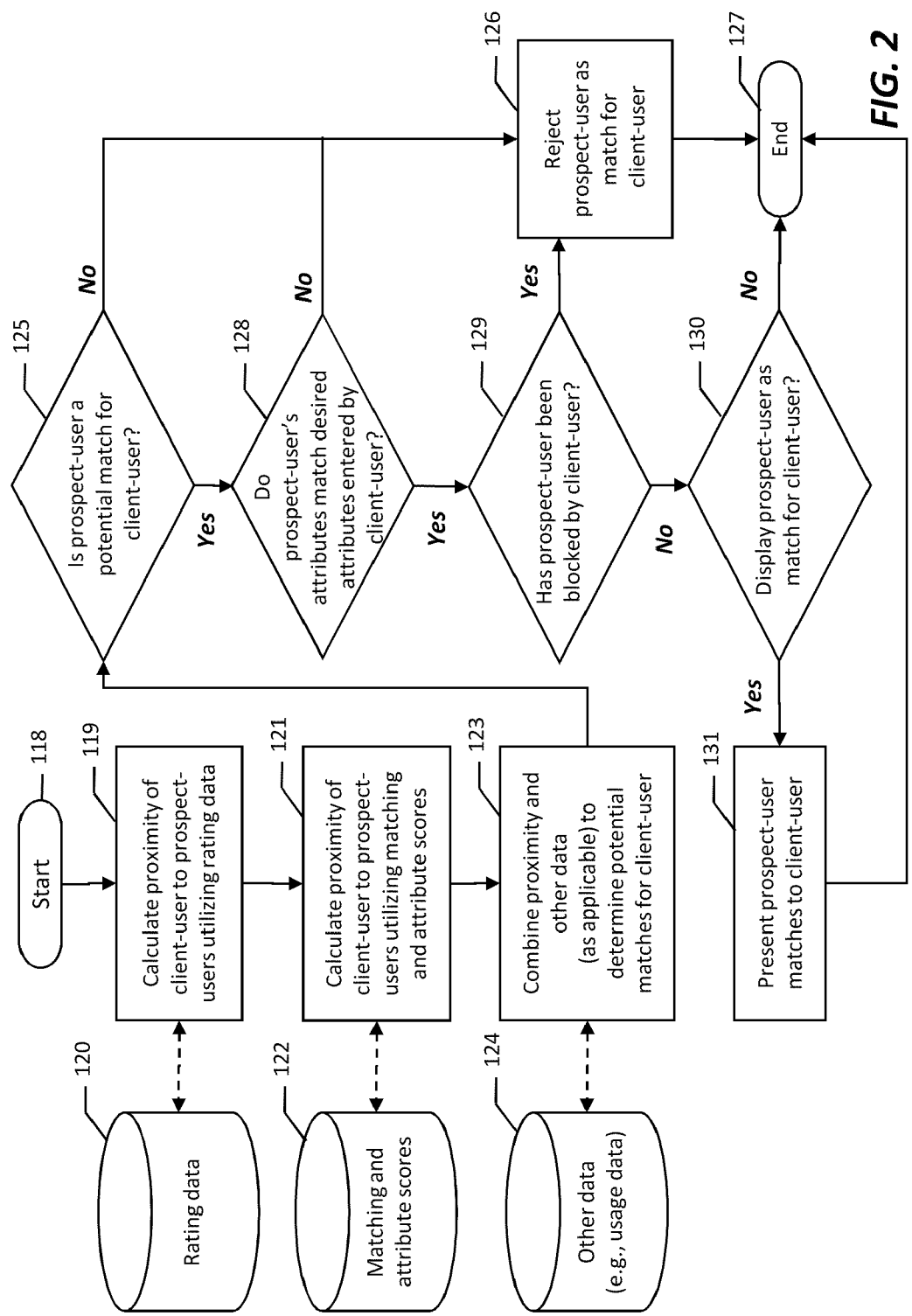
FIG. 2 is a second flowchart of a process for matching social network users.

Referring now to FIG. 2 there is shown a process for utilising rating data entered by users to determine optimal matches of users to prospects. Further, FIG. 2 illustrates how a user may find prospects that have only those attributes that are explicitly entered by a user (e.g., through a sought attributes definition interface as illustrated in FIG. 4, and as provided in step 103 in FIG. 1). Further, FIG. 2 illustrates how to refine what is known about what each user and about what each user is seeking in potential prospects, thereby improving subsequent matching based on the ratings given by one user to the next.

The matching model process initiates at 118 and 119 when the system calculates the proximity of users and prospects utilizing rating data at 120 (e.g., as collected, for example, at 195 in an example interface illustrated in FIG. 6). Further, the system may utilize rating data to estimate which users are most like other users based on users receiving similar ratings from other users (e.g., where two users obtain high ratings from the same individual, this would serve to identify that these users are more similar than where two users have obtained different ratings). Further, the system may identify users that have rated each other high and low, and utilize this data in conjunction with the estimate of how similar one user is to the next to estimate how users will rate other users that they have not yet rated.

Matching and attribute scores may be used at 122 to estimate the proximity of users to prospects at 121 (e.g., the system uses matching scores, that represent estimated levels of certain attributes that individual users are seeking and attribute scores, that represent the estimated attributes that individual users possess, to determine optimal matches). The matches for users may be determined by calculating the distance between users' matching scores and a prospects' attribute scores, and the distance between a prospects' matching scores and a users' attribute scores.

The matches for users may be determined through incorporating other data at 124 such as the geographic distance between users and prospects. The proximity data calculated in steps 119 and 121, and other data at 124 may be used to determine potential matches for the client user. If the prospect is not a match for the user at 125, the system may reject the prospect as a match for the user at 126. On the other hand, if the prospect is deemed to be a potential match for the user based on the combination of proximity data and other data at 123 and 125, the system may evaluate whether the prospect's attributes match the attributes explicitly entered by the user at 128.

Steps 119, 121, and 123 may each be executed insofar as relevant data is available for the user being matched.

If the prospect's attributes don't match the desired attributes explicitly entered by the user, the prospect is rejected as a match for the client user at 126. If the prospect's attributes match what has been entered by the user as desired, the system evaluates whether the prospect user has been blocked by the user at 129. If the prospect has been blocked by the user, the prospect is rejected as a match for the prospect user at 126. If the prospect user has not been blocked by the user, a determination is made regarding whether to display the prospect as a match for the user at 130. For example, a prospect may not be displayed as a match for a user if the user has formerly met and rated the prospect (see FIG. 6, step 195). Additionally, for example, a prospect may not be displayed as a match for the user if the user has already added the prospect as a friend (see FIG. 6, step 201) or if the user has explicitly indicated that the user would want to remove the prospect as a match (see FIG. 6, step 202). If the prospect is to be displayed as a match for the user, the prospect's profile information may be displayed or otherwise made available to the user, as appropriate, at 131.

Displaying Matched Prospects to Users:

Referring again to FIG. 1, at step 105 matched prospects are displayed to users based on whether the system determines whether each matched prospect should be displayed (see FIG. 2 step 131).

Figure 5:
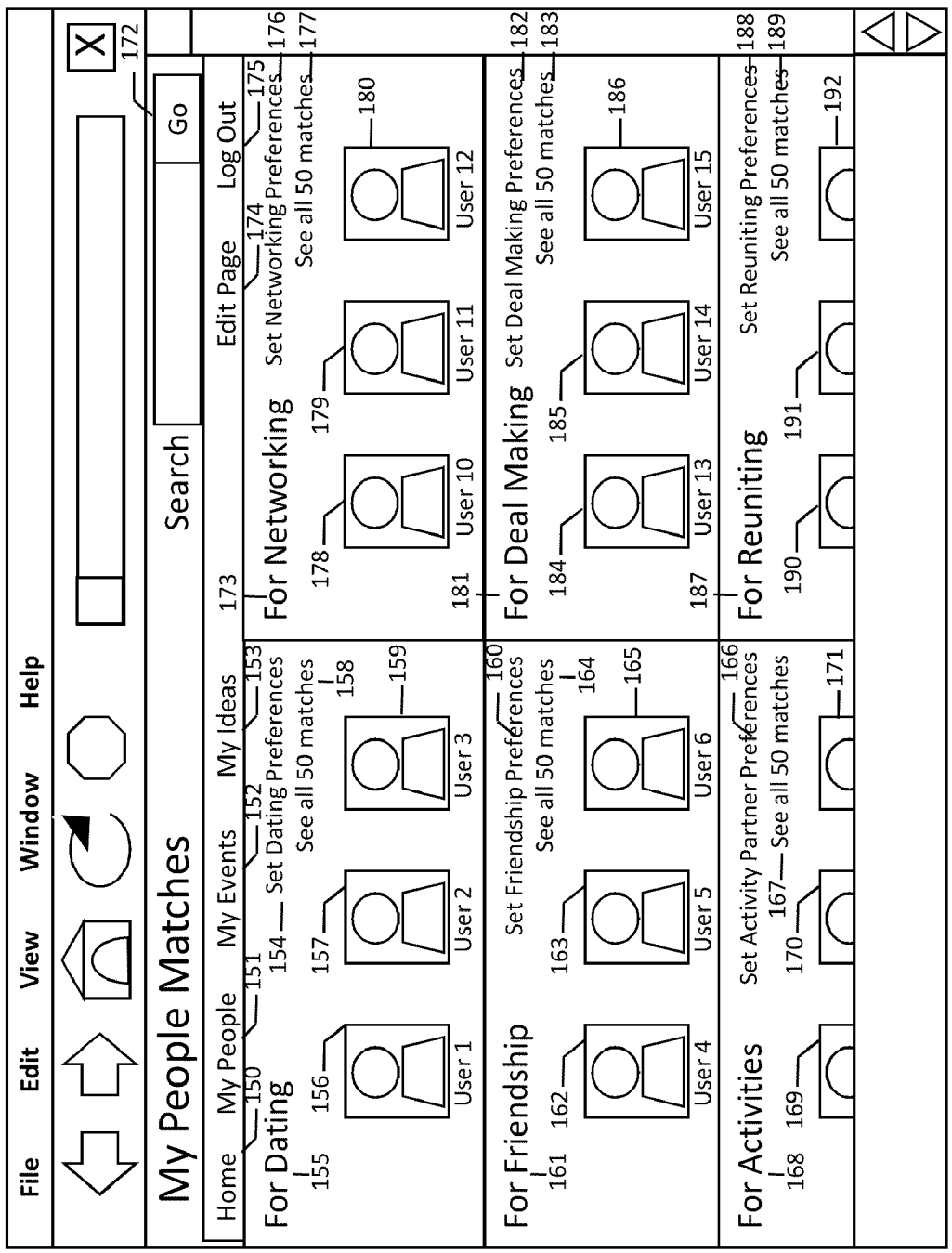
FIG. 5 is a screen display displaying potential matches.

Referring now to FIG. 5, a screen display of a matched prospects interface presented to the user is shown. A user may be presented with matched prospects in various categories such as matches for dating at 155, matches for friendship at 161, matches for activities at 168, matches for networking at 173, matches for deal making at 181, and matches for reuniting at 187. Other and/or different relationship categories may be displayed in the prospects interface.

For each relationship category shown in the prospect interface, the top user profiles may be presented to users. For example, in the contemplated "Dating" relationship section shown at 155, the top matches are shown at 156, 157, and 159. Further, additional matches may be referenced as seen at 158. Specific explicit attribute filters may be set for each type of relationship, for example, at 154, 160, 166, 176, 182, and 188. These explicit attribute filters may be used to determine what matches are presented to users, as referenced at 128 in FIG. 2.

Displaying Profile Information of Matched Prospects to Users:

Users may view profiles of other users. FIG. 6 presents an example view of a profile display interface. Users may navigate to such profile interface by clicking on the photo of a prospect (for example, at 156) in the matched prospect interface in FIG. 5. Links on the profile display interface may allow users to indicate how the user wishes to interact with other users or manage the relationship with other users. For instance, links may allow the user to open an email interface at 197 (see FIG. 7), view a prospect's profiles on other social networking sites at 198, navigate to see the friends interface at 199, send "wink" messages to other users at 200, invite other users as friends at 201, remove one or more users as prospect matches at 202, block prospects from contacting the users at 203, and see the blogs of the prospect at 204. Further, users may rate prospects when accessing the prospects' profile at 194 and 195.

Interaction Between Prospects and Users:

Users may send email to prospects such as by clicking on a link on the profile interface at 197. Clicking on a certain link on profile interface at 197 will cause an email interface such as shown in FIG. 7 to display to the user.

Figure 7:
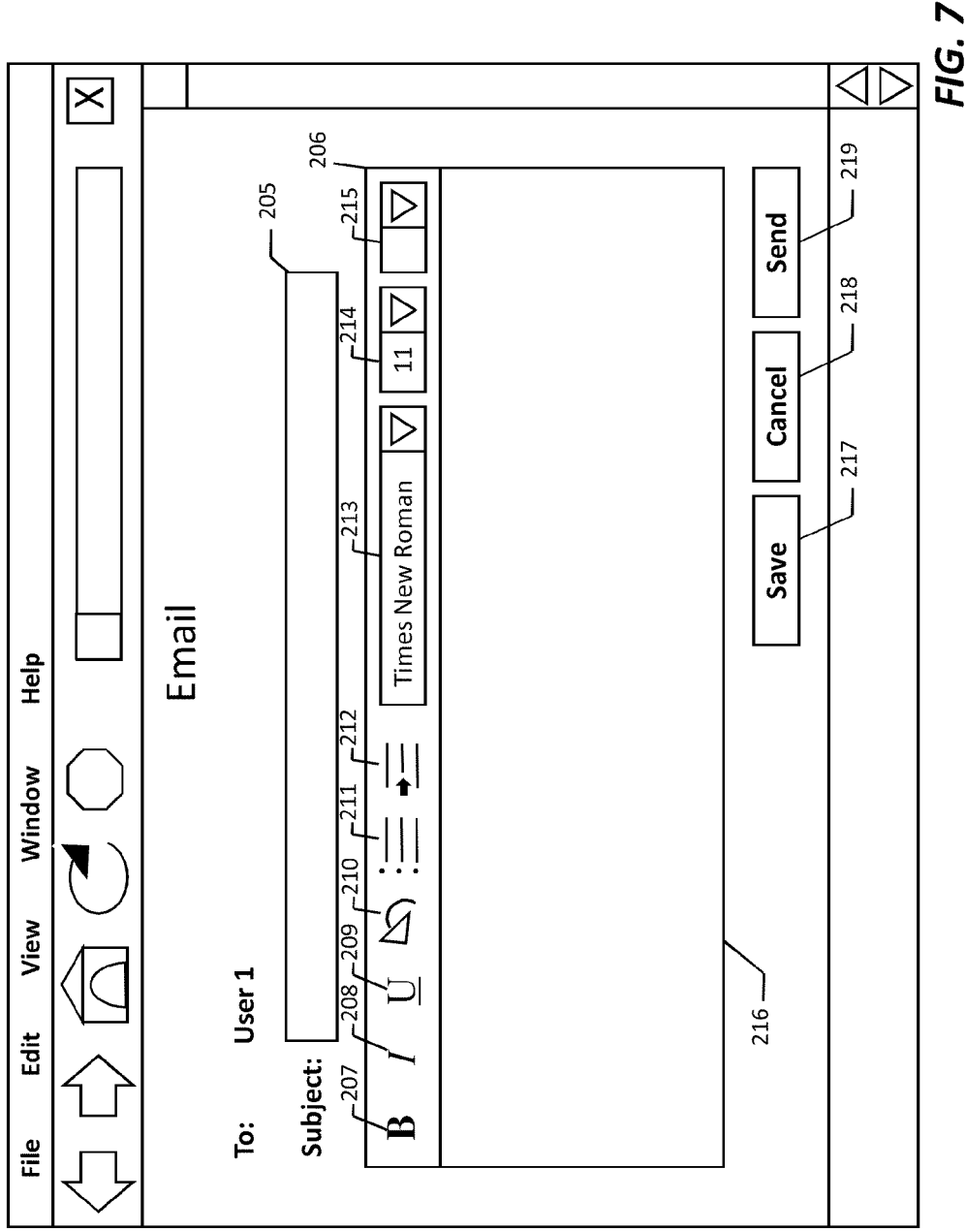
FIG. 7 is a screen display of an email message creation interface.

Referring now to FIG. 7, an example of the email interface presented to the user is shown. Users will be, for example, able to enter a message to a prospect (for example, at 216) in the matched prospect interface in FIG. 5. Users may be provided with text formatting tools 206, such as tools to bold text 207, to underline text 209, to bullet text 211, to change the font type 213, to change font size 214, and/or to change font color 215. Further, users may be able to enter a subject line for their messages 205.

Figure 8:
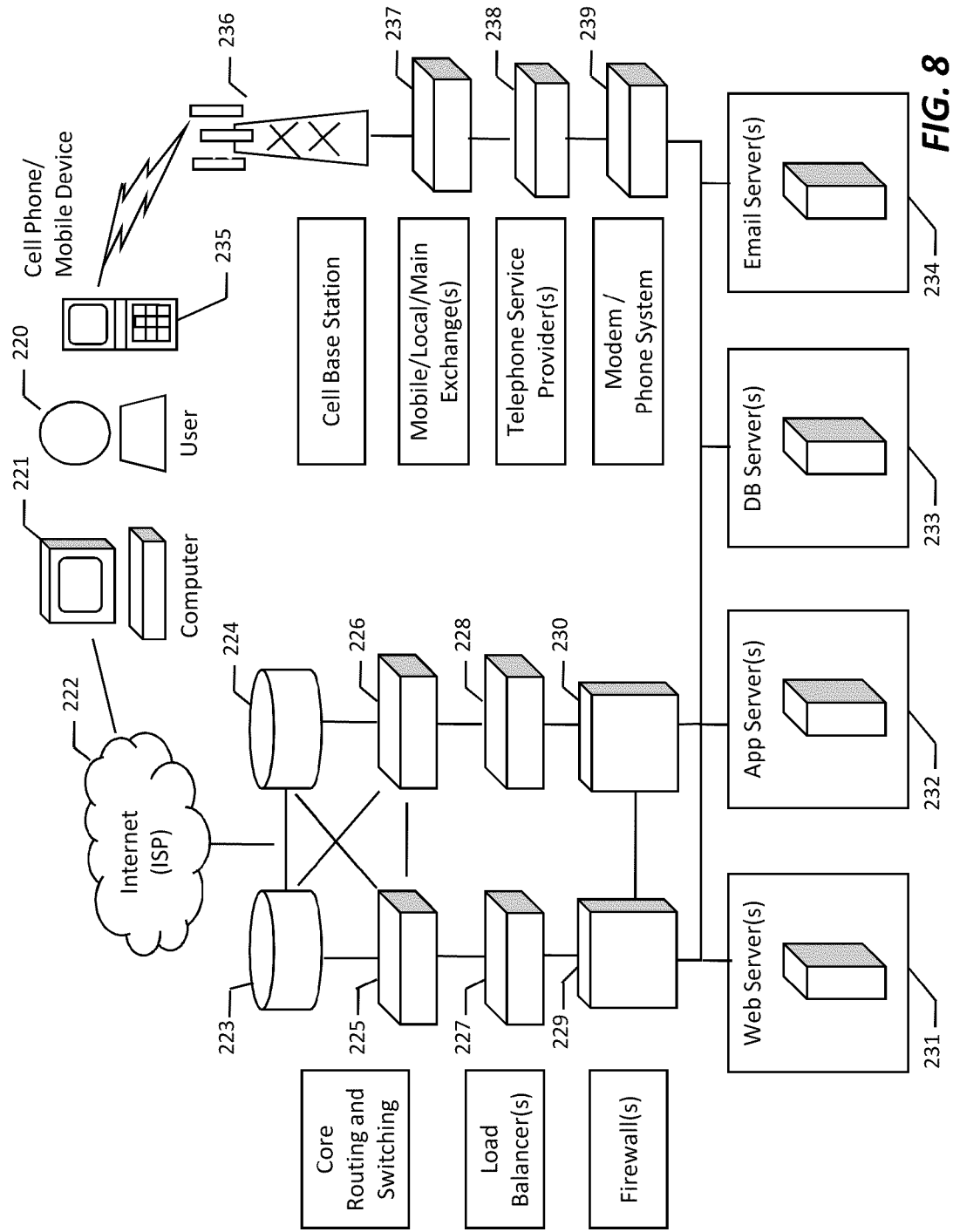
FIG. 8 is a system block diagram of a system for matching social network users.

Computer Execution Environment (Hardware):

The systems and methods disclosed herein may be implemented as computer software in the form of computer readable program code executed on one or more general-purpose computers or other computing device and through a communication network such as the system illustrated in FIG. 8. The system consists of servers such as one or more web servers 231, one or more application servers 232, one or more database servers 233, and/or one or more email servers 234. Users may be able to access the computer system via computer 221 and via cell phone or mobile device 235. For example, if users access the system via computer 221, the computer would access the system through the Internet 222. The system may incorporate routing and switching 223, 224, 225, and 226, and one or more load balancers 227 and 228 to appropriately route Internet traffic to the appropriate hardware (such as servers). The system may incorporate one or more computer firewalls 229 and 230 to help ensure only permitted traffic is allowed to system hardware. The system may be deployed in cloud architecture.

Access may be provided to users through a telephone/wireless network as illustrated in steps 239, 238, 237, 236 and 235 in FIG. 8. Such telephone/wireless access, for example, will allow users to receive voice and/or portable computer access to system functionality As shown, prospects may be recommended to the user based in whole or in part on the ratings the user has given previous matches (e.g., in addition to sought attributes explicitly entered by the user), functionality to utilize the rating information entered by users to further refine what is known about users and users' preferences, and ability to have prospects recommended to the user utilizing this refined understanding of each user and each user's preferences. Collectively or in part, this may allow users to have matches provided to them and matches further refined as they continue to use the system. Further, information entered by users may be validated through refinement provided via the ratings given by other users. Further, users may obtain an understanding of the prospects that the user would find desirable further refined as the user uses the system.

Further, matches may be provided to the users based on attributes that may not be explicitly captured in the system. The system may match users to prospects based on attributes not explicitly captured in the system since prospects may be recommended to the user based on the collective ratings provided to the prospect, and the commonality which has caused the prospect to be rated similarly by others may not be explicitly captured as an attribute in the system.

The matching model matches each user to those that are estimated to have similar and/or dissimilar characteristics to those that the user has previously indicated higher or lower preference for. Rating data may be used to refine what is understood about users and/or user matching preferences. This data may be used in matching users one to another.

A client computer may include software and/or hardware for providing functionality and features described herein. A client computer may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computer 100 may include various specialized units, circuits, software and interfaces for providing the functionality and features described here. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by a client computer and others by other devices.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, smart phones, portable computers, and laptop computers. These computing devices may run an operating system, including, for example, variations of the Linux, Microsoft Windows, and Apple Mac operating systems.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computer system for recommending prospects to social network users, the client computer comprising:
    a user input device;
    a display device;
    a processor;
    a memory;
    wherein the processor and the memory comprise circuits and software for:
        obtaining personal attribute information from a first plurality of the users;
        obtaining desired-prospect attribute information from a second plurality of the users;
        identifying a plurality of prospects to recommend to the users based on the personal attribute information and the desired-prospect attribute information;
        obtaining ratings of a plurality of prospects from a third plurality of the users;
        recommending a subset of the prospects to a fourth plurality of the users, wherein the recommended subset of the prospects have acceptable proximities to the users based upon the ratings, the desired-prospect attribute information and the personal attribute information; and
        providing to a fifth plurality of the users respective preliminary lists of prospects, and obtaining from the fifth plurality of users each user's rating of the prospects in the user's respective preliminary list, wherein the ratings reflect the user's opinion of a quality of match of the prospects in the preliminary fist, and wherein the fifth plurality of the users comprises a subset of the first plurality of users, the second plurality of users and the third plurality of the users.

2. The computer system of claim 1 wherein recommending comprises
    scoring user-prospect matches to indicate quality of match between respective prospects and users, wherein the scores are derived from weighting plural matched attribute information of the prospects to the users' desired-prospect attributes.

3. The computer system of claim 1, the circuits and software further for using the ratings to estimate which prospects are most like other prospects based on similarity of ratings of the prospects.

4. The computer system of claim 1 wherein at least some of the users are also prospects, the circuits and software for further for
    identifying users that have rated each other high and low, and using these identifications in conjunction with an estimate of how similar one user is to the other to estimate how the users will rate other users that they have not yet rated.

5. The computer system of claim 1 wherein
    if a prospect is deemed to be a potential match for a given user based on a combination of proximity data and other data, then evaluating whether the prospect's attributes match the user's desired-attributes.

6. The computer system of claim 1 wherein recommending further comprises categorizing the prospects.

7. The computer system of claim 6 wherein the categories are selected from the group consisting of dating, friendship, activities, networking, deal making and reuniting.

8. The computer system of claim 1 wherein the circuits and software for obtaining ratings of at least some of other users.

9. The computer system of claim 1 wherein recommending further comprises scoring matches of users and prospects.

10. The computer system of claim 9, the circuits and software further for
adjusting the scores based on the attributes of the prospect being rated.

11. The computer system of claim 9, the circuits and software further for
adjusting the scores based on the ratings.

12. The computer system of claim 9, the circuits and software further for
invalidating ratings by a given user if the given user has a pattern of ratings which fail to correlate to ratings by other users.

13. A process for recommending prospects to social network users, the process comprising:
obtaining personal attribute information from a first plurality of the users;
obtaining desired-prospect attribute information from a second plurality of the users;
identifying a plurality of prospects to recommend to the users based on the personal attribute information and the desired-prospect attribute information;
obtaining ratings of a plurality of prospects from a third plurality of the users;
recommending a subset of the prospects to a fourth plurality of the users, wherein the recommended subset of the prospects have acceptable proximities to the users based upon the ratings, the desired-prospect attribute information and the personal attribute information; and
providing to a fifth plurality of the users respective preliminary lists of prospects, and obtaining from the fifth plurality of users each user's rating of the prospects in the user's respective preliminary list, wherein the ratings reflect the user's opinion of a quality of match of the prospects in the preliminary list, and wherein the fifth plurality of the users comprises a subset of the first plurality of users, the second plurality of users and the third plurality of the users.

14. The process of claim 13 wherein recommending comprises
scoring user-prospect matches to indicate quality of match between respective prospects and users, wherein the scores are derived from weighting plural matched attribute information of the prospects to the users' desired-prospect attributes.

15. The process of claim 13 comprising using the ratings to estimate which prospects are most like other prospects based on similarity of ratings of the prospects.

16. The process of claim 13 wherein at least some of the users are also prospects, the process further comprising
identifying users that have rated each other high and low, and using these identifications in conjunction with an estimate of how similar one user is to the other to estimate how the users will rate other users that they have not yet rated.

17. The process of claim 13 wherein
if a prospect is deemed to be a potential match for a given user based on a combination of proximity data and other data, then evaluating whether the prospect's attributes match the user's desired-attributes.

18. The process of claim 13 wherein recommending further comprises categorizing the prospects.

19. The process of claim 18 wherein the categories are selected from the group consisting of dating, friendship, activities, networking, deal making and reuniting.

20. The process of claim 19 wherein at least some of the users rate other users.

21. The process of claim 19 wherein recommending further comprises scoring matches of users and prospects.

22. The process of claim 21 further comprising
adjusting the scores based on the attributes of the prospect being rated.

23. The process of claim 21 further comprising
adjusting the scores based on the ratings.

24. The process of claim 21 further comprising
invalidating ratings by a given user if the given user has a pattern of ratings which fail to correlate to ratings by other users.

25. An apparatus comprising a storage memory storing a program having instructions which when executed by a processor will cause the processor to recommend prospects to social network users, the instructions of the program for:
obtaining personal attribute information from a first plurality of the users;
obtaining desired-prospect attribute information from a second plurality of the users;
identifying a plurality of prospects to recommend to the users based on the personal attribute information and the desired-prospect attribute information;
obtaining ratings of a plurality of prospects from a third plurality of the users;
recommending a subset of the prospects to a fourth plurality of the users, wherein the recommended subset of the prospects have acceptable proximities to the users based upon the ratings, the desired-prospect attribute information and the personal attribute information; and
providing to a fifth plurality of the users respective preliminary lists of prospects, and obtaining from the fifth plurality of users each user's rating of the prospects in the user's respective preliminary list, wherein the ratings reflect the user's opinion of a quality of match of the prospects in the preliminary fist, and wherein the fifth plurality of the users comprises a subset of the first plurality of users, the second plurality of users and the third plurality of the users.

* * * * *

UNITED STATES PATENT AND TRADEMARK OFFICE
CERTIFICATE OF CORRECTION

| | | |
|---|---|---|
| PATENT NO. | : 8,060,573 B2 | Page 1 of 1 |
| APPLICATION NO. | : 12/622729 | |
| DATED | : November 15, 2011 | |
| INVENTOR(S) | : Melissa Leonard | |

It is certified that error appears in the above-identified patent and that said Letters Patent is hereby corrected as shown below:

In the Specifications:

Column 4, line 28: replace --utilising-- with "utilizing."

Signed and Sealed this
Twentieth Day of December, 2011

David J. Kappos
*Director of the United States Patent and Trademark Office*